United States Patent [19]

Kosmyna et al.

[11] Patent Number: 5,205,849
[45] Date of Patent: Apr. 27, 1993

[54] AIR FILTER HAVING A LOW INTERNAL PRESSURE DROP

[75] Inventors: Michael J. Kosmyna, Toledo; Robert H. Verb, Graytown; Andrew P. Gargac, Oregon, all of Ohio

[73] Assignee: Ransburg Corporation, Indianapolis, Ind.

[21] Appl. No.: 905,773

[22] Filed: Jun. 29, 1992

[51] Int. Cl.$^5$ .............................................. B01D 46/40
[52] U.S. Cl. ......................................... 55/337; 55/422; 55/475; 55/496; 55/509; 210/448
[58] Field of Search ................. 85/320, 321, 337, 422, 85/475, 494, 496, 503, 509, 510; 210/446, 448, 496

[56] References Cited

U.S. PATENT DOCUMENTS

| | | | |
|---|---|---|---|
| 1,293,114 | 2/1919 | Kendrick | 210/496 X |
| 1,742,919 | 1/1930 | Manning | |
| 2,068,048 | 1/1937 | Adams | 55/509 X |
| 2,426,405 | 8/1947 | McDermott | 55/510 |
| 2,521,060 | 9/1950 | Hallinan | 55/496 X |
| 2,581,337 | 1/1952 | Lapik | 210/446 |
| 2,772,001 | 11/1956 | Bowers | 210/165 |
| 2,905,326 | 9/1959 | Judson et al. | 210/446 X |
| 3,370,711 | 2/1968 | Hitzelberger et al. | 210/448 |
| 3,402,529 | 9/1968 | Frantz | 55/337 X |
| 3,483,677 | 12/1969 | Pinto | 55/337 X |
| 3,487,942 | 1/1970 | Lee et al. | 210/439 |
| 3,838,977 | 10/1974 | Warren | 55/475 X |
| 3,872,008 | 3/1975 | Lee et al. | 210/232 |
| 4,361,425 | 11/1982 | Hata | 55/337 X |
| 4,592,839 | 6/1986 | Rosenberg | 210/446 X |
| 4,666,473 | 5/1987 | Gerdau | 55/320 X |
| 4,731,178 | 3/1988 | Rosenberg | 55/503 X |
| 4,882,052 | 11/1989 | Peranio et al. | 210/282 |
| 4,955,995 | 9/1990 | Pontius | 55/274 |
| 5,078,762 | 1/1992 | Hung | 55/337 X |
| 5,085,266 | 2/1992 | Arold et al. | 55/510 X |
| 5,106,506 | 4/1992 | Schmidt et al. | 55/510 X |
| 5,110,330 | 5/1992 | Loughran | 55/275 |

FOREIGN PATENT DOCUMENTS

| | | | |
|---|---|---|---|
| 1-210008 | 8/1989 | Japan | 55/475 |
| 0591202 | 1/1978 | U.S.S.R. | 210/446 |

OTHER PUBLICATIONS

Filtering Functions, by Foamex, A Limited Partnership, apparent publication date 1989.

Primary Examiner—Robert Spitzer
Attorney, Agent, or Firm—MacMillan, Sobanski & Todd

[57] ABSTRACT

Disposable air filter includes a filter element formed from a stacked plurality of annular disks. The disks are formed from a sorptive material and expand upon absorption of oil or water droplets. The disks are slightly compressed by a movable baffle. The baffle floats upon a stream of air entering the filter and directs the air radially through the filter element. The air flows between and through the disks with a resulting low pressure drop across the filter. As the disks expand, the baffle shifts axially within a filter housing to maintain the pressure drop across the filter element.

9 Claims, 1 Drawing Sheet

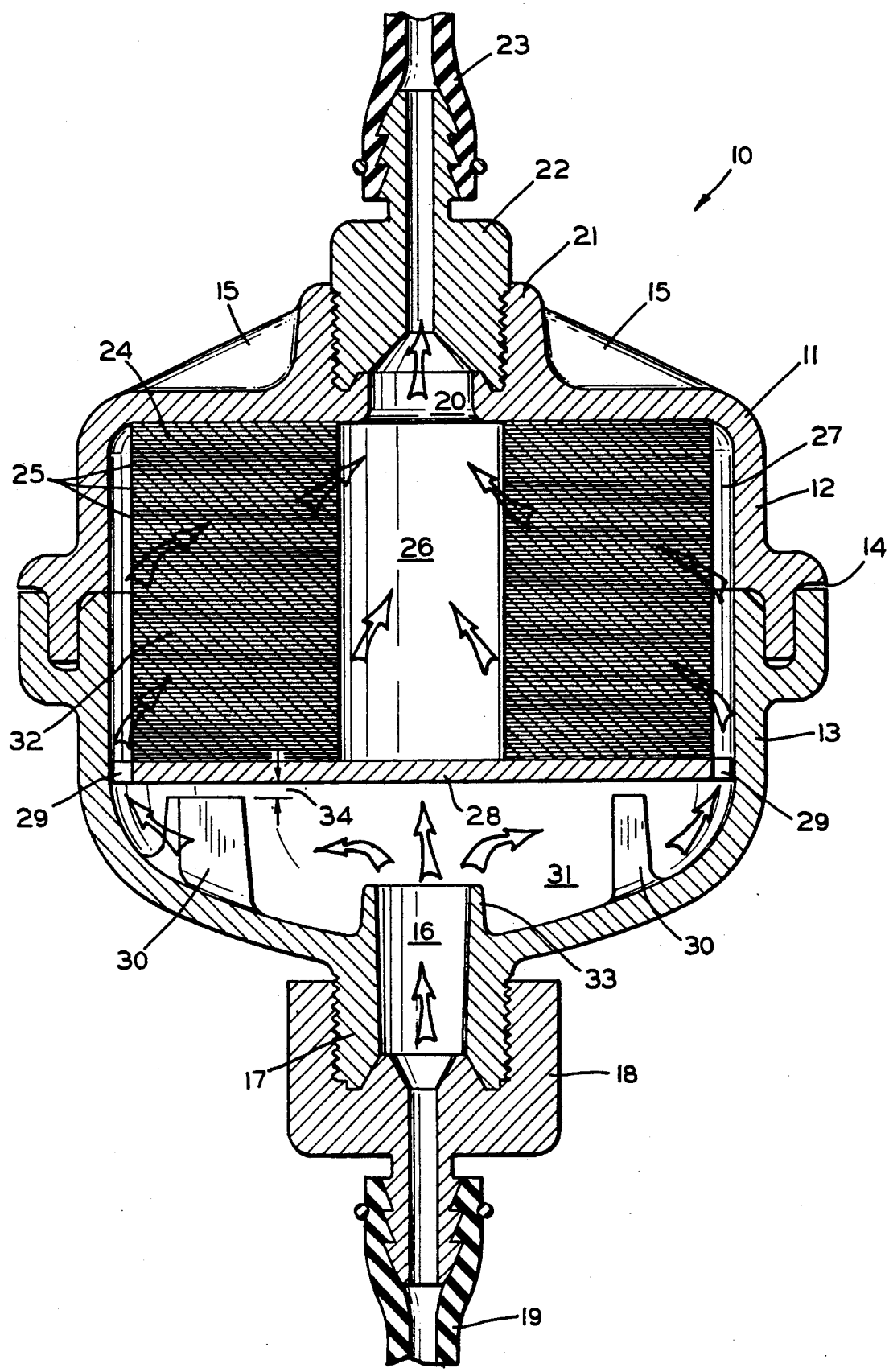

AIR FILTER HAVING A LOW INTERNAL PRESSURE DROP

TECHNICAL FIELD

The invention relates to filters and more particularly to a disposable air filter which maintains a low pressure drop between inlet and outlet filter ports throughout the filter life.

BACKGROUND ART

Filters are well known devices for removing contaminants from a flow of fluid or gas. Filters are sometimes included in air compressor systems supplying compressed air to paint spray guns. Such systems typically include an air compressor, a compressed air storage tank, a pressure regulator, valves, and a flexible hose to convey the compressed air to the spray gun. In a commercial painting operation, a central compressor can supply a number of paint spray guns through an extensive compressed air distribution system. Air compressors are sometimes known to introduce oil and water droplets into the air as it is compressed. Furthermore, as the compressed air passes from the compressor through air lines and hoses to the spray gun, dirt, rust and other debris can become entrained in the air flow. The operation of the spray gun will mix these contaminants with the paint and thereby apply an inferior coat of paint. Furthermore, water and oil have been known to condense within air lines during equipment downtime. Upon restarting painting operations, such condensate can be expelled through the spray gun. Therefore, air filters are often included in compressor systems to remove these contaminants from the compressed air. Such air filters are typically inserted into the compressed air supply line in close proximity to the spray gun. As an alternative location, a small air filter can be mounted directly upon the gun.

Compressed air filters typically include a cylindrical rigid housing having an inlet port at one end for receiving unfiltered compressed air and an outlet port at the other end for discharging filtered air. A cylindrical filter element is disposed within the housing between the inlet and outlet ports. The filter element is typically formed from a porous paper or a cloth material or an open celled foam material. The structure of the filter causes an axial flow of air through the filter element. The filter element absorbs water and oil droplets and entraps any dirt, rust or other debris which might be present.

The filter element presents a resistance to the flow of compressed air through the filter, causing a pressure drop across the filter. As the filter element accumulates contaminants, the flow resistance and accompanying pressure drop increase. Eventually, the filter element can become completely plugged, blocking the flow of air through the filter to the spray gun. If the filter receives a slug of water from the air line, the filter media may attempt to expand. In prior art filters, the filter media is confined. When the filter media absorbs water, the resulting expansion closes the air passages and the pressure drop across the filter increases. Thus, the filters have a finite life and must be periodically replaced.

Since the pressure supplied to the filter is held relatively constant by a pressure regulator, any increase in pressure drop across the filter results in lower pressure available to operate the spray gun. Even with periodic filter replacement, the decline of air pressure available to the spray gun during the later portion of the filter life can adversely affect spray gun performance. Thus, there is a need for an air filter that maintains a low pressure drop across its filter element throughout the filter life.

DISCLOSURE OF INVENTION

The invention is directed towards a disposable air filter having an internal structure that produces a low pressure drop across the filter throughout the filter life. The filter is particularly useful with air operated paint spray guns.

The filter includes a cylindrical rigid housing having an inlet port adapted to be connected to a supply of compressed air and an outlet port adapted to to be connected to a paint spray gun. A cylindrical filter element is disposed within the housing between the inlet and outlet ports. The filter element includes a plurality of stacked annular disks formed from a sorptive material. The stacked disks form an axial passageway aligned with the outlet port. The filter also has an axially movable baffle disposed within the housing between an inlet chamber and the filter element. Notches formed in the perimeter of the baffle direct the flow of air between the housing side walls and the outside surface of the filter element. Vanes in the inlet chamber impart a swirl to the air flowing to the baffle notches. The swirling action causes any entrained liquid droplets to condense on the chamber walls prior to reaching the filter element. The condensed droplets will gradually evaporate as air flows through the filter.

The flow of compressed air from the inlet port into the inlet chamber urges the baffle away from the inlet port and against the filter element. The baffle presses the filter element against the housing forming a seal around the outlet port. The stacked element disks present a low flow resistance as the air flows through and between the individual disks. Thus, the filter has a low pressure drop across the filter element. As contaminants are absorbed by the filter the element disks expand. This expansion pushes the baffle towards the inlet port while maintaining the same pressure on the filter element. Thus, the baffle floats within the filter housing allowing expansion of the element disks to maintain substantially constant the low pressure drop across the filter element. In addition, the baffle shifts to adjust for any change in air supply pressure.

Accordingly, it is an object of this invention to provide an improved in-line air filter having a low pressure drop across its element throughout the filter life.

Other objects and advantages of the invention will be apparent from the following detailed description and the accompanying drawing.

BRIEF DESCRIPTION OF THE DRAWING

The sole drawing is a sectional elevational view of an in-line air filter in accordance with the invention.

BEST MODE FOR CARRYING OUT THE INVENTION

Referring now to the drawing, an in-line disposable air filter 10 is shown in accordance with a preferred embodiment of this invention. In the drawing, arrows indicate the flow of compressed air through the filter 10. The filter 10 includes a cylindrical rigid housing 11 molded from a solvent resistant plastic such as acetal resin. The housing 11 has an upper housing 12 joined to a lower housing 13 by means of a tongue and groove joint 14. The upper housing 12 is permanentally secured to the lower portion 13 along the joint 14 by convention means such as ultrasonic welding, spin welding or gluing. While a tongue and groove joint is illustrated in the figure, it will be appreciated that other structures can be used for joining the upper and lower housings 12 and 13 together. However, the tongue and groove joint 14 provides greater strength than many joints typically used on air filters. Preferably the lower housing 13 is formed having a known 2:1 elliptical shape to add strength to the filter housing 11 to contain internal pressurization. The upper housing 12 includes external ribs 15 for strength.

The lower housing 13 includes an inlet port 16 formed trough an externally threaded nipple 17 extending from the lower housing 13. The threaded nipple 17 receives a conventional female hose coupling 18. A flexible hose 19 is secured to the hose coupling 18 for supplying compressed air. Similarly, the upper housing 11 includes an outlet port 20 formed through an internally threaded tubular outlet boss 21. The outlet port 20 discharges filtered air from the filter 10. The ribs 15 support the boss 21. The threaded boss 21 may receive a conventional male hose coupling 22 attached to a flexible hose 23. As an alternative, the filter 10 can be directly mounted upon a spray gun (not shown) by attaching the threaded boss 21 directly to a threaded fitting at the compressed air inlet to the spray gun.

A cylindrical filter element 24 consisting of a plurality of stacked flat annular disks 25 is mounted in the housing 11. The individual disks 25 are formed from a conventional sorptive material. Typical materials include cellulose fiber, synthetic fiber, soft paper and open cell foam. A preferred material for the disks 25 is a fabric made from Dupont Sontara Style 8801 which is a blend of woodpulp and polyester and has a thickness of 0.016 inch (0.4mm). The disks 25 expand as liquid contaminants are absorbed from the air flow through the filter 10. The stacked disks 25 form a central air chamber 26 having an upper end adjacent to the outlet port 20. The outside diameter of the disks 25 is less than the inside diameter of the housing 11. Thus, an annular outer chamber 27 is formed between the outer circumference of the filter element 24 and the inside surface of the housing 11.

A circular baffle 28 is disposed within the housing 10 between the filter element 24 and the inlet port 16. The baffle 28 has a plurality of notches 29 spaced around its perimeter forming passages which allow air to flow between the baffle 28 and the lower housing 13. The baffle 28 is supported by curved vanes 30 extending upwardly from the bottom of the lower housing 13 between the inlet port 16 and the notches 29. The baffle 28 separates a lower chamber 31 located adjacent the inlet port 16 from an upper chamber 32 located adjacent the outlet port 20. An annular dam 33 extends from the lower housing 13 about the inlet port 16 into the lower air chamber 31.

The filter element 24 is located in the upper chamber 32 between the baffle 28 and the upper housing 12. The baffle 28 closes a lower end of the central chamber 26 in the filter element 24. The height of the vanes 30 is chosen such that a gap 34 exists between the top surfaces of the vanes 30 and the bottom surface of the baffle 28 when the baffle 28 is pushed upwardly. The gap 34 compensates for variations in thicknesses of the individual disks 25 and allows for expansion of the filter element 24 as liquid contaminants are absorbed. The gap 34 is sufficiently large to allow the baffle 28 to shift axially within the housing 11.

In operation, unfiltered high velocity compressed air is introduced into the lower chamber 31 through the inlet port 16. The air is deflected by the bottom of the baffle 28. As the air is deflected, the air flow pushes the baffle 28 upward, slightly compressing the filter element 24 and forming a seal between the top of the element 24 and the top surface of the upper housing 12. As the air expands within the lower chamber 42, the air flow velocity is reduced, which reduces the air velocity through the filter element 24.

The chambers 31 and 27 present a significantly larger cross sectional area to the air flow through the filter 10 than the hoses 19 and 23. Consequently, the air velocity decreases in the filter. The curved vanes 30 impart a circular flow to the air flow within the lower chamber 31. The lower flow velocity and the swirling of air within the lower chamber 31 tends to cause any entrained larger oil and/or water drops to be separated from the air flow. These drops accumulate in the bottom of the lower chamber 31 where the dam 33 prevents reentrainment with the incoming air. Water accumulated in the bottom of the filter 10 will tend to evaporate as time passes. Thus, water condensed in the air lines during equipment downtime is removed without affecting spray gun operation.

The circular air flow moves up the inside of the walls of the filter housing 11, through the baffle notches 29 and into the annular chamber 27. The air is forced radially inwardly through the filter element 24 to the central chamber 26. The radial flow path presents a significantly larger filter surface air to the air than an axial path used in prior art filters. The filter element surface area for this invention is typically about 45 percent greater than similarly sized axial flow air filters. The stacking of individual disks 25 within the filter element 24 allows the air to flow both through and between the disks 25. The large filter element surface area and stacking of the disks 25 further decreases the pressure drop across the filter element 24. As the air flows through the filter element 24, the filter disks 25 absorb any water and oil droplets and trap dirt, rust and other debris. The air is discharged from the central air chamber 26 through the outlet port 20.

The filter disks 25 will expand as water and oil is absorbed and will contract as any absorbed water is gradually evaporated. The expansion of the disks 25 pushes against the baffle 28. The gap 34 allows the baffle 28 to shift axially towards and away from the inlet port 16 as the size of the filter element 24 changes. In addition, higher input air flow rates will cause the baffle 28 to shift upward, compressing the filter element 24 to prevent contaminants from being forced through the filter element 24. Thus, the baffle 28 floats within the housing 11 to maintain the low pressure drop across the filter element 24.

While the filter 10 is shown in a vertical position in the drawing, it will be appreciated that it will function equally well in other positions. For example, with the filter 10 in a horizontal position, any fluid trapped in the bottom of the filter 10 would flow into a portion of the outer annular chamber 27 and either remain there or be absorbed by a portion of the filter element 24. Thus, the filter 10 can be attached directly to a spray gun and moved therewith without degrading performance. It will also be appreciated that the filter 10 can be used in other applications than those involving paint spray guns. For example, the filter 10 can be included in the compressed air supply line for pneumatic tools.

We claim:

1. In an air filter including a closed housing having an inlet port and an outlet port axially aligned with said inlet port, an annular filter element in said housing having a central chamber aligned with said outlet port, said housing forming an annular chamber surrounding said filter element, the improvement comprising a movable baffle mounted in said housing between said inlet port and said filter element to form an inlet chamber, said baffle having a perimeter, said baffle being free to move in said housing under the influence of inlet air flow towards said filter element and said outlet port, a plurality of air passages spaced around said baffle perimeter connecting said inlet chamber with said annular chamber, and wherein air flow through said inlet port into said inlet chamber impinges on said baffle to urge said baffle against said filter element to form a seal between said baffle and said filter element and to form a seal around said outlet port between said filter element and said housing.

2. An air filter, as set forth in claim 1, and further including a plurality of vanes secured to said housing in said inlet chamber, said vanes limiting movement of said baffle away from said outlet port.

3. An air filter, as set forth in claim 2, and wherein said vanes are spaced between said inlet port and said baffle passages and are curved to impart a swirling action to air flowing from said inlet port to said baffle passages, said swirling action causing any liquid droplets entrained in the inlet air flow to condense in said inlet chamber.

4. An air filter, as set forth in claim 3, and wherein said filter element comprises a plurality of annular disks stacked in said housing, and wherein air flow through said inlet port impinging on said baffle moves said baffle to urge said disks together.

5. An air filter, as set forth in claim 3, and further including an annular dam formed in said housing to surround said inlet port and to extend into said inlet chamber, said dam preventing any liquid collected in said inlet chamber from entering said inlet port.

6. An air filter, as set forth in claim 1, and wherein said filter element comprises a plurality of annular disks stacked in said housing, and wherein air flow through said inlet port impinging on said baffle moves said baffle to urge said disks together.

7. An air filter, as set forth in claim 1, and further including an annular dam formed in said housing to surround said inlet port and to extend into said inlet chamber, said dam preventing any liquid collected in said inlet chamber from entering said inlet port.

8. An air filter, as set forth in claim 1, and wherein said housing has a cylindrical side and an elliptical end forming a side of said inlet chamber.

9. An air filter, as set forth in claim 8, wherein said housing has a generally flat end opposite said elliptical end and a curved portion connecting said flat end with said side, wherein said outlet port includes a tubular projection extending from said flat end, and wherein said housing includes a plurality of ribs reinforcing said flat end and said tubular projection.

* * * * *